United States Patent [19]

Shephard, Jr. et al.

[11] 3,864,464

[45] Feb. 4, 1975

[54] PREPARATION OF BERYLLIUM HYDRIDE

[75] Inventors: Lawrence H. Shephard, Jr.; Paul Kobetz, both of Baton Rouge; Roy J. Laran, Greenwall Springs, all of La.; Robert W. Johnson, Jr., Savannah, Ga.

[73] Assignee: Ethyl Corporation, New York, N.Y.

[22] Filed: Jan. 27, 1965

[21] Appl. No.: 430,237

[52] U.S. Cl. .......... 423/645, 260/94.9 R, 260/95 R, 260/665
[51] Int. Cl. ............................................. C01b 6/00
[58] Field of Search ...................... 23/204; 423/645

[56] References Cited
UNITED STATES PATENTS

| | | | |
|---|---|---|---|
| 2,425,712 | 8/1947 | Alexander | 23/204 |
| 2,994,587 | 8/1961 | Vose | 23/204 |
| 3,007,970 | 11/1961 | Ashby | 260/606.5 |
| 3,155,732 | 11/1964 | Lang | 260/606.5 |

*Primary Examiner*—Leland A. Sebastian
*Attorney, Agent, or Firm*—Donald L. Johnson; John F. Sieberth; Lewis Hess

[57] ABSTRACT

1. Process for the preparation of beryllium hydride which comprises reacting, at a temperature of from 75° to about 200°C, an organodiborane of the general formula $R_4B_2H_2$ with a dihydrocarbyl beryllium compound of the general formula $R_2'Be$ wherein R and R' represent radicals selected from the group consisting of alkyl, monocyclic cycloalkyl and monocyclic aryl radicals containing from 1 to about 10, 5 to about 10 and 6 to about 10 carbon atoms, respectively, and recovering beryllium hydride from the reaction product.

9 Claims, No Drawings

PREPARATION OF BERYLLIUM HYDRIDE

This invention relates to and has as its principal objects the provision of a novel composition of matter, beryllium bis(diethylborohydride), and of a method of preparing the same, and the provision of a novel and effective process for the production of beryllium hydride of high purity.

In accordance with the present invention, a beryllium bis(diorganoborohydride) is produced by the reaction, at a temperature between ambient temperature and the decomposition temperature of the product, of a tetraorganodiborane of the general formula $R_4B_2H_2$ with a diorganoberyllium compound of the general formula $R_2'Be$ wherein R and R' are alkyl, monocyclic cycloalkyl, or monocyclic aryl radicals, containing from 1 to about 10, 5 to about 10 or 6 to about 10 carbon atoms, respectively. After reaction is complete, the beryllium bis(diorganoborohydride) product is recovered from the reaction mixture by removal of the triorganoborane by-product under vacuum or by other suitable separatory procedure.

If the product of the foregoing reaction is subjected to thermal decomposition, or if the above process is carried out ab initio at a temperature above the thermal decomposition temperature of said product, beryllium hydride of high purity is obtained.

It has been found, for example, that when tetraethyl diborane, $Et_4B_2H_2$, dissolved in toluene, is treated with a toluene solution of diethyl beryllium, the mixture is heated to about 110°C. so as to complete the reaction and the reaction mixture is subjected to vacuum distillation, beryllium hydride of a purity in excess of 80 percent by weight is obtained. Since beryllium hydride is very useful in the chemical and allied arts, the improved preparative process of the present invention constitutes a valuable addition to the art.

The reaction of the instant invention has a number of important and advantageous features. Among these are the ease of preparation and purification of the reactants and the possibility of recycling the organoborane by-products, thus avoiding waste of an intrinsically expensive material and thereby increasing significantly the economy of the overall process.

The invention will be more fully understood by reference to the following illustrative examples in which all parts and percentages are by weight.

EXAMPLE I

Preparation of Tetraethyl Diborane

Tetraethyldiborane was prepared as described by Köster et al., Ann. 644, 15 (1961).

Triethylborane was hydrogenated under 5000 psig at 160 to 185°C. to a mixture of triethyldiborane and tetraethyldiborane. Sufficient triethylborane was then added to the mixture of organodiboranes to convert the triethyl diborane present to tetraethyl diborane.

The product was a colorless pyrophoric liquid with a boiling point of 111°C. Analysis of the tetraethyl diborane was accomplished by measuring the amount of gas liberated upon hydrolysis of a weighed sample. The purity was found to be 99 weight percent, the remainder of the sample being triethylborane.

EXAMPLE II

Preparation of Beryllium Hydride

Into a suitable reactor were introduced 7.19 parts (51.3 millimoles) of tetraethyl diborane dissolved in 130 parts of dry toluene. The solution was stirred at room temperature while 3.09 parts (46.0 millimoles) of diethyl beryllium were added dropwise. After the addition was complete, the solution was heated to boiling with continued stirring for a period of 30 minutes. Approximately two-thirds of the toluene was removed by distillation. The precipitated beryllium hydride was separated by filtration, washed several times on the filter with dry pentane, and dried overnight under vacuum at room temperature. After further drying for 3 hours at 175° to 185°C., under a pressure of 0.1 mm of mercury, the product analyzed, by hydrolysis, 82.7 weight percent of beryllium hydride and 1.3 percent of diethyl beryllium.

When the experiment of Example II is repeated, replacing the ethyl groups of the two reactants with isobutyl, cyclohexyl, or phenyl radicals, similar results are obtained.

When the experiment of Example II is repeated with reversal of the order of addition, so that the tetraethyl diborane is added to the diethyl beryllium, beryllium hydride precipitates immediately, but the product is less pure than that obtained by the procedure of Example II, which is therefore preferred.

EXAMPLE III

Preparation of Beryllium Hydride

Example II was repeated using equimolar amounts of tetraethyldiborane (6.99 parts) and diethyl beryllium (3.36 parts) the former being dissolved in 43.4 parts of toluene. The beryllium hydride so produced, after vacuum treatment at 150° for 2 hours and then at 180° for 2 hours under a pressure of 0.1 mm of mercury, analyzed 79.4 percent pure.

When Example III was repeated reversing the order of addition of the reactants, namely, adding the tetraethyl diborane to the diethyl beryllium, the purity of the resultant beryllium hydride was reduced to 32.2 percent.

When Example II was repeated using only a 1.8 percent excess of tetraethyldiborane, the purity of the beryllium hydride product was 76.5 percent.

EXAMPLE IV

Preparation of Beryllium Bis(diethyl borohydride)

Tetraethyldiborane (28.8 parts, 206 millimoles) was introduced into a suitable reactor equipped with a stirrer and a reflux condenser. 6.91 Parts (103 millimoles) of diethylberyllium were added dropwise with continuous agitation and external cooling by means of an ice bath. When reaction was complete, the volatile products were separated by evacuation at room temperature, and were condensed in a dry-ice trap. Analysis of the residue in the trap by acid hydrolysis showed 2 percent of tetraethyl diborane; the remainder was triethylborane.

The residue in the reactor was a colorless liquid which was identified, by hydrolysis and molecular weight determination, as beryllium bis(diethyl borohydride), $Be(BEt_2H_2)_2$. Hydrolysis of the product yielded 26.0 millimoles of hydrogen per gram. Theory for $Be(BEt_2H_2)_2$ is 26.5 millimoles per gram.

The molecular weight of the product was found, by cryoscopic determination in benzene, to be 151.5 ± 2.5. Theory for Be(BEt$_2$H$_2$)$_2$ is 151.

When the experiment of Example IV is repeated, replacing the tetraethyldiborane with tetramethyldiborane, tetraisobutyldiborane, tetraneopentyldiborane, tetra(2-ethylhexyl) diborane, tetra-n-decyldiborane, tetracyclopentyldiborane, tetracyclopentadienyldiborane, tetracyclohexyldiborane, tetrakis(methylcyclopentyl) diborane, tetrakis(dimethylcyclohexyl) diborane, tetrakis(isobutylcyclohexyl) diborane, tetraphenyldiborane, tetra-o-tolyldiborane, tetrakis(2,4-xylyl) diborane, tetramesityldiborane or tetraisoduryldiborane, and replacing the diethylberyllium with dimethylberyllium, diisobutylberyllium, dineopentylberyllium, bis(2-ethylhexyl) berryllium, di-n-decylberyllium, dicyclopentylberyllium, dicyclopentadienylberyllium, dicyclohexylberyllium, bis(methylcyclopentyl) beryllium, bis(dimethylcyclohexyl) beryllium, bis(isobutylcyclohexyl) beryllium, diphenylberyllium, di-o-tolylberyllium, bis(2,4-xylyl) beryllium, dimesitylberyllium or diisodurylberyllium, similar results are obtained.

EXAMPLE V

The beryllium bis(diethylborohydride) (1.51 parts, 100 millimoles) obtained by the procedure of Example IV was replaced under a reduced pressure of 40 to 60 millimeters of mercury and heated gradually over a period of 4 to 6 hours, to 180°C. The product was beryllium hydride of a purity in excess of 71 percent by weight.

When the experiment of Example V is repeated, replacing the ethyl groups of the beryllium bis(diethylborohydride) with isobutyl, cyclohexyl or phenyl radicals, similar results are obtained.

The reactants employed in the process of this invention comprise, as indicated above, a tetraorganodiborane of the general formula R$_4$B$_2$H$_2$ and a diorganoberyllium compound of the general formula R$_2$'Be. The organic moieties, R and R', of these reactants may be any of a wide variety of organic radicals. Thus the tetraorganodiboranes are exemplified by tetramethyldiborane, tetra-n-propyldiborane, tetraisobutyldiborane, tetra-n-octyl diborane, tetraisononyldiborane, tetra-n-decyl diborane, tetracyclopentyldiborane, tetracyclohexyldiborane, tetra(methylcyclohexyl) diborane, tetra(ethylcyclohexyl) diborane, tetra(isopropyl cyclohexyl) diborane, tetra(isopropyl cyclopentyl) diborane, tetra(n-butyl cyclohexyl) diborane, tetra(diethyl cyclohexyl) diborane, tetraphenyldiborane, tetraorthotolyl diborane, tetra(2,4-xylyl) diborane, tetra-p-cumenyl diborane, tetramesityldiborane and tetraduryldiborane.

Similarly the diorganoberyllium reactants are exemplified by dimethylberyllium, di-n-propyl beryllium, diisobutylberyllium, di-tert-butyl beryllium, diisoamylberyllium, di-n-octyl beryllium, di-isodecyl beryllium, isomethylethylberyllium, methylisohexyl beryllium, isopropylheptyl beryllium, dicyclopentyl beryllium, cyclopentyl methylcyclopentyl berrylium, bis(methylcyclopentyl) beryllium, bis(cyclohexyl) beryllium, bis(ethylcyclohexyl) beryllium, bis(isopropyl cyclohexyl) beryllium, bis(n-butyl cyclohexyl) beryllium, diphenylberyllium, diorthotolyl beryllium, di-p-tolyl beryllium, di-2,3-xylyl beryllium, bis(ortho-n-butyl phenyl) beryllium and bis(diethylphenyl) beryllium.

In carrying out the process of this invention, the ratio of the reactants can be varied within wide limits, namely, from the amount stoichiometrically required to a 100 percent or greater excess thereover of the tetraorganodiborane reactant. The use of stoichiometric quantities yields satisfactory results, but a moderate excess, of the order of about 10 percent of the tetraorganodiborane reactant increases the rate and degree of completeness of the reaction and is therefore preferred.

A wide variety of temperatures can be employed in the process of the invention. The applicable range depends upon the particular reactants and pressure employed and upon whether or not it is desired to isolate the borohydride intermediate.

When the product sought is beryllium hydride, the reaction temperature can range from about 75° to about 200°C. and the pressure from about 0.1 mm of mercury to about 10 atmospheres. When the reactants are diethyl beryllium and tetraethyl diborane, the preferred range from about 75° to about 95°C. and the preferred pressure about atmospheric. Higher alkyl derivatives require, in general, higher upper temperature limits for completeness of reaction. Atmospheric pressure is generally preferred because of the ease of operation associated therewith.

When the borohydride product is desired, the temperature must, evidently, not exceed the decomposition temperature thereof, and this largely depends on the identities of the reactants and of the particular beryllium bis(dihydrocarbyl borohydride) to be prepared. In the case of the diethyl derivative, the temperature can range from about 0° to about 75°C. and the pressure from 10 mm of mercury or below to 5 atmospheres or above. Atmospheric pressure and temperatures in the range of from about 20° to about 75°C. are preferred because such conditions provide both stability of the product and a practical reaction rate.

The reaction time for the preparation of either the borohydride or beryllium hydride can range from 15 minutes or less to 24 hours or more, depending upon the reaction temperature and the nature of the reactants. Other things being equal, increasing the molecular weight of the organic components of the reactants tends to reduce the reaction rate and increase the needed reaction time. Generally speaking, the higher the reaction temperature the shorter the reaction period.

The reactions of the present invention can be carried out in the absence of any solvent, but the use of a solvent results in improved mixing of the reactants and in a higher product purity. Consequently, such use is preferred. Any solvent may be used which is inert with respect to the reactants and the product or products and which is liquid under the reaction conditions.

The solvents employed may include aromatic hydrocarbons such as benzene, toluene and the xylenes; saturated aliphatic hydrocarbons such as n-hexane, isooctane, trimethylhexane, n-dodecane and n-cetane; saturated cycloaliphatic hydrocarbons such as cyclopentane, cyclohexane, and cycloheptane; saturated aliphatic ethers such as diethyl ether, diisobutyl ether, di-isoamyl ether, di-n-octyl ether, ethyl heptyl ether, ethyl isoamyl ether and the dimethyl and diethyl ethers of diethylene glycol; aromatic ethers such as diphenyl ether, anisole and phenetole; hydrocarbon sulfides such as diethyl sulfide, di-n-propyl sulfide, di-sec-butyl sulfide and diphenyl sulfide; and tertiary amines such as trimethyl amine, triethyl amine and tri-n-butyl amine. When the reactants are the ethyl derivatives or other low-boiling derivatives of beryllium and diborane, toluene is the preferred solvent because its boiling range is such as to facilitate the separation of the reaction products.

Either of the reactants can be added to the other depending on the particular reactants in use. However, when the ethyl derivatives are used, it is preferred to add the beryllium reactant slowly to the boron reactant to assure an excess of the latter, particularly at the end of the reaction. This order of addition is preferred because of difficulties inherent in the separation of excess organoberyllium reactant from the reaction mixture.

The reaction of this invention may be carried out under any atmosphere inert to both reactants and products but dry nitrogen is preferred. Other suitable protective atmospheres include dry hydrogen, carbon monoxide, helium, neon, argon, krypton and xenon.

The beryllium hydride obtained by the process of this invention is a useful intermediate in the preparation of beryllium alkyls by olefination as described, for example, in U.S. Pat. No. 2,826,598 issued Mar. 11, 1958 to Ziegler and Gellert. It can be used for the metal plating of suitable substrates by thermal decomposition under suitable conditions in contact with said substrates. It is useful as a source (by thermal decomposition) of pure metallic beryllium for use both in alloys and as a chemical raw material.

The beryllium bis(dialkyl borohydrides) prepared by the process of this invention are highly useful as organometallic reducing components of Ziegler-type catalysts for making polyethylene, polypropylene and similar polymers. Typical examples of such catalytic systems are combinations of beryllium bis(diethylborohydride) with titanium trichloride, titanium tetrachloride and vanadium trichloride, respectively.

These borohydride products are also useful as intermediates in the preparation, by olefination of the complex, of higher beryllium alkyls from those of low molecular weight.

I claim:

1. Process for the preparation of beryllium hydride which comprises reacting, at a temperature of from 75° to about 200°C., an organodiborane of the general formula $R_4B_2H_2$ with a dihydrocarbyl beryllium compound of the general formula $R_2'Be$ wherein R and R' represent radicals selected from the group consisting of alkyl, monocyclic cycloalkyl and monocyclic aryl radicals containing from 1 to about 10, 5 to about 10 and 6 to about 10 carbon atoms, respectively, and recovering beryllium hydride from the reaction product.

2. Process for the preparation of beryllium hydride which comprises adding a dihydrocarbyl beryllium compound of the general formula $R_2'Be$ to a minor excess of an organodiborane of the general formula $R_4B_2H_2$ wherein R and R' represent radicals selected from the group consisting of alkyl, monocyclic cycloalkyl, and monocyclic aryl radicals containing from 1 to about 10, 5 to about 10 and 6 to about 10 carbons atoms, respectively, said addition being carried out at a temperature in the range of from about 0° to about 200°C. and at a pressure in the range of from about 0.1 mm to about 10 atmospheres and maintaining the reaction mixture at said temperature and pressure for a period ranging from less than 0.25 to more than 24 hours, sufficient to assure substantially complete conversion to beryllium bis(dihydrocarbyl borohydride), then heating said reaction mixture at a temperature in the range of from about 50° to about 180°C. under a pressure of from about 0.5 to about 760 mm of mercury for a period ranging from less than 0.25 to more than 24 hours, sufficient to assure substantially complete precipitation of beryllium hydride and recovering said beryllium hydride from the reaction product.

3. Process in accordance with claim 2 wherein the organodiborane is a tetraalkyldiborane and the dihydrocarbyl beryllium compound is a dialkyl beryllium compound.

4. Process in accordance with claim 2 wherein the organodiborane is tetraethyldiborane and the dihydrocarbyl beryllium compound is diethyl beryllium.

5. Process in accordance with claim 2 wherein the reaction is carried out in a solvent.

6. Process in accordance with claim 2 wherein the reaction is carried in an inert solvent which is liquid under the reaction conditions.

7. Process in accordance with claim 2 wherein the reaction is carried out in toluene as a solvent.

8. Process for the preparation of beryllium hydride which comprises heating a beryllium bis(dihydrocarbyl borohydride), wherein the hydrocarbyl radicals are selected from the group consisting of alkyl, monocyclic cycloalkyl, and monocyclic aryl radicals containing from 1 to about 10, 5 to about 10 and 6 to about 10 carbon atoms, respectively, at a temperature in the range of from about 50° to about 180°C. under a pressure of from about 0.5 to about 760 mm of mercury for a period ranging from less than 0.25 to more than 24 hours, sufficient to assure substantially complete precipitation of beryllium hydride and recovering said beryllium hydride from the reaction product.

9. Process in accordance with claim 8, wherein said beryllium bis(dihydrocarbyl borohydride) is beryllium bis(diethyl borohydride).

* * * * *